United States Patent [19]
Mitchell et al.

[11] Patent Number: 5,549,468
[45] Date of Patent: Aug. 27, 1996

[54] HEATING LAMP ASSEMBLY

[75] Inventors: Monroe S. Mitchell, Dunwoody; Vinson A. Loos, Woodstock, both of Ga.

[73] Assignee: Constar Plastics Inc., Atlanta, Ga.

[21] Appl. No.: 325,881

[22] Filed: Oct. 19, 1994

[51] Int. Cl.⁶ .................................................. B29C 49/64
[52] U.S. Cl. .......................... 425/526; 264/535; 425/528; 425/534; 432/11; 432/121; 219/388; 219/404
[58] Field of Search .................................. 425/174.4, 526, 425/528, 534; 264/535; 432/10, 11, 121; 219/388, 403, 404

[56] References Cited

U.S. PATENT DOCUMENTS

| | | | |
|---|---|---|---|
| Re. 34,177 | 2/1993 | Coxhead et al. | 432/5 |
| 3,975,618 | 8/1976 | Goos et al. | 219/388 |
| 4,147,487 | 4/1979 | Dickson et al. | 425/174.4 |
| 4,204,111 | 5/1980 | Yonko | 219/411 |
| 4,396,816 | 8/1983 | Krishnakumar et al. | 219/770 |
| 4,411,610 | 10/1983 | Poppe et al. | 425/174.4 |
| 4,423,312 | 12/1983 | Wiedenfeld et al. | 219/388 |
| 4,476,364 | 10/1984 | Prevot et al. | 219/775 |
| 4,605,839 | 8/1986 | Rasmussen et al. | 392/420 |
| 4,606,723 | 8/1986 | Pasternicki | 432/124 |
| 4,690,633 | 9/1987 | Schad et al. | 425/526 |
| 4,923,395 | 5/1990 | Coxhead et al. | 432/5 |
| 5,277,574 | 1/1994 | Denis et al. | 425/526 |
| 5,292,243 | 3/1994 | Gibbemeyer | 425/526 |
| 5,322,651 | 6/1994 | Emmer | 264/25 |
| 5,326,258 | 7/1994 | Gittner et al. | 432/5 |

Primary Examiner—James P. Mackey
Attorney, Agent, or Firm—Locke Reynolds

[57] ABSTRACT

An alignment assembly for aligning heating lamps in a heating lamp assembly intended for use in an oven of a blow molding machine, the heating lamp assembly having a chassis removably positionable in at least one preselected location in the machine and including a vertical array of generally horizontally disposed lamps held in position by a lamp holder coupled to each end of each lamp. The alignment assembly has a baseplate including a coupling for coupling the chassis to the baseplate. A pair of standards are coupled to another plate movable relative to the baseplate projecting upward therefrom for holding a vertical scale and a plurality of vertically positionable and horizontally reciprocable gages indicate the relative position of the lamp holders.

8 Claims, 7 Drawing Sheets

5,549,468

HEATING LAMP ASSEMBLY

BACKGROUND OF THE INVENTION

The present invention relates generally to apparatus for heating plastic preforms or parisons prior to blow molding containers, and particularly to apparatus for adjustably mounting heating lamps within an assembly such that a desired heating profile can be repeatedly obtained, and to apparatus for precisely measuring the position and alignment of the heating lamp mounting apparatus.

In many blow molding machines, a series of parisons are conveyed continuously along a defined path through an oven wherein heat is applied to the parisons from a battery of heating elements typically taking the form of linearly elongated infrared bulbs. Each bulb is arranged substantially horizontally and retained in position by clips which both hold the bulb at a desired position and connect the bulb to a source of electrical power. In some apparatus, the bulbs are situated at a fixed location and are not subject to repositioning. An example of such an apparatus is shown in FIG. 4 of U.S. Pat. No. 4,690,633.

It has been recognized that ovens for heating plastic preforms having heating lamps which are immovable makes the task of achieving a desired temperature profile throughout the body of the parisons very difficult. This is particularly true where the machine is used to mold a variety of containers from preforms of varying design. It has therefore been suggested to provide individual holders for each of the heating lamps which are independently movable with respect to each other toward and away from the path of the parisons. This linear adjustability is achieved by providing a plurality of shafts penetrating a wall of the preform oven, with a lamp being mounted on the inside end of the shaft. The outer end of the shaft includes a handle by which the position of the shaft can be manipulated from outside the oven while the oven is operating. An example of such an apparatus is disclosed in U.S. Pat. No. 4,923,395.

While this design for a linearly adjustable blow molding oven substantially enhances one's ability to adjust the temperature profile of parisons traveling through the oven, the design still does not achieve optimum temperature profile adjustment in all situations. Additionally, the exterior adjustability of the elements raises the likelihood of unauthorized changes to the temperature profile by machine operators not understanding the critical machine set-up or the desire to repeat exactly an earlier set-up.

SUMMARY OF THE INVENTION

In contrast to the prior art, the present invention provides a heating lamp assembly for a blow molding machine which provides for both horizontal and vertical displacement of the heating lamps relative to each other and with respect to the path taken by the parisons to further enhance the ability of achieving the optimal thermal characteristics in the parison prior to blow molding. Additionally, the apparatus provides for the adjustments to be made wholly on the inside of the apparatus so no changes in position of the bulbs can be achieved by unauthorized individuals while the machine is in operation.

This is achieved by providing a chassis which is removably positionable at one or more preselected locations relative to the base of a blow molding machine oven. A pair of brackets is fixed to the chassis with each bracket including a vertically arranged way. A plurality of couplings are coupled in the way, each coupling being independently adjustably positioned vertically relative to the bracket to which it is coupled. Each bracket carries an arm which is horizontally adjustably positionable relative to the coupling, the arm having a lamp holder connected to an innermost end of the arm so it can be situated adjacent to the path of the plastic parisons in the blow molding oven.

This combination of features has the advantage of allowing for both vertical and horizontal positioning of each heating lamp with the adjustment being achieved with the chassis removed from the blow molding oven. The positioning of the heating lamps is achieved with the aid of an alignment assembly which includes a base plate which couples to the removable chassis holding the heating lamp assembly. An indicator means is carried by the base plate which is adapted to contact the lamp holders to indicate the relative positions of the lamp holders.

In the preferred embodiment, a pair of upwardly projecting standards are coupled to the base plate for holding the indicator means at a desired position in alignment with the lamp holders. At least one gauge member is carried by and vertically positionable with respect to each of the standards, each gauge member being horizontally reciprocal in relationship to the standard. Preferably a scale is fixed to the standard and cooperates with an indicator on the gauge member to indicate the vertical position of the gauge member and hence the vertical position of the lamp holder. Each gauge member includes a set of regularly spaced graduations, which graduations are revealed upon displacement of the gauge member relative to the standard by contact with the lamp holder, the displacement being a measure of the horizontal position of the lamp.

The features of the alignment assembly have the advantage of permitting the heating lamps of a heating lamp assembly in accordance with the present invention to be precisely positioned at a desired location to replicate an earlier heating profile for a given preform. This is achieved by removing the heating lamp assembly from the blow molding machine oven and coupling the chassis to the base plate of the alignment assembly. Each of the lamp holders are vertically aligned to confront one of the gauge members on the indicator means. The base plate is then horizontally positioned so that each lamp holder is in contact with a confronting gauge member. Finally, by reading the vertical and horizontal scales indicating the position of each gauge member, adjustments can be made to the horizontal position of each lamp to the preselected position whereupon the heating lamp assembly can be replaced in the oven.

One feature of the present invention is the use of a single alignment assembly to align the heating lamps of a plurality of heating lamp assemblies which has the advantage of insuring uniform positioning of the lamps at specified locations to achieve a particular thermal profile. Another feature of the present invention is the enhanced variability of position of the heating lamps which is achieved by providing for vertical as well as horizontal positioning of the heating lamp with respect to the defined parison path. Additionally, the radiant energy emitted by the heating lamps can be selectively directed toward the parison path through the use of reflectors so as preferably to impinge perpendicularly onto the surface of the parison especially in the transition and tip areas of the parison.

These and other features and advantages will become apparent to those skilled in the art upon consideration of the following description of preferred embodiments. The description makes specific reference to the accompanying figures.

DESCRIPTION OF THE PREFERRED EMBODIMENT

Figure 1:
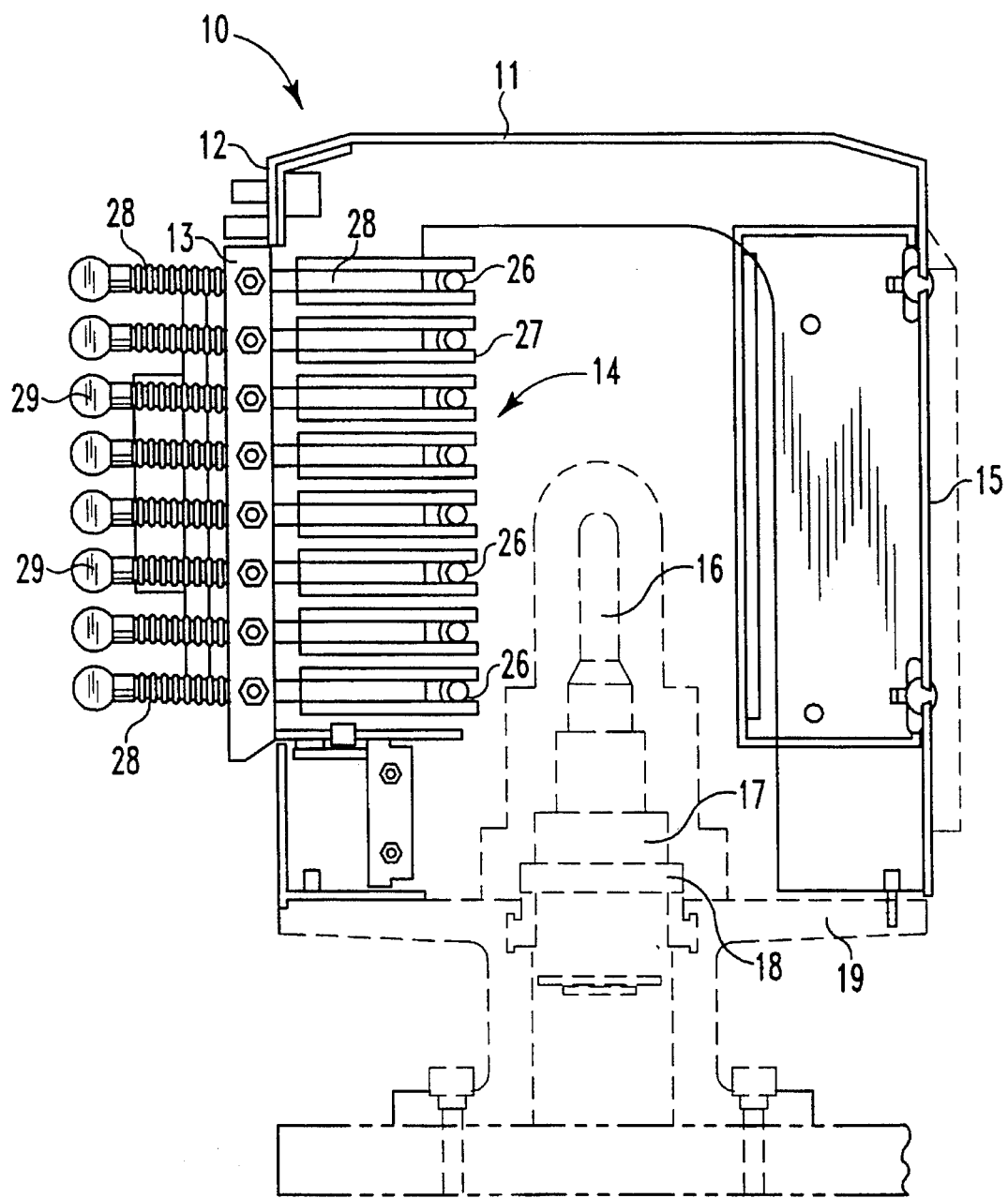
FIG. 1 is a vertical sectional view of a prior art apparatus having horizontally movable heating elements.

A prior art parison oven 10 of a blow molding machine includes an oven enclosure 11 having side walls 12 and 15 supported on a base 19. An array 14 of heating elements are mounted on oven side wall 12 by means of bracket 13. A parison 16 is supported by mandrel 17 which is rotatably mounted on conveyor 18 traveling along a predefined path. The conveyor 18 moves a continuous stream of such parisons 16 in and out of the oven 10 for the purpose of receiving heat treatment from the array 14 of heating elements 26 prior to blow molding. The individual heating elements 26 constitute conventional horizontally elongated tubes designed to emit high levels of infrared energy, and are pictured in FIG. 1 in cross-section. The heating tubes 26 are supported at each end by movable supports 27 which permit the tubes 26 to be moved horizontally toward and away from the path traversed by the conveyor 18. This movement is achieved by means of shaft 28 which projects through oven side wall 12 and terminates in an operating knob 29. Additional details of the construction of this apparatus are to be found in U.S. Pat. No. 4,923,395.

Figure 2:
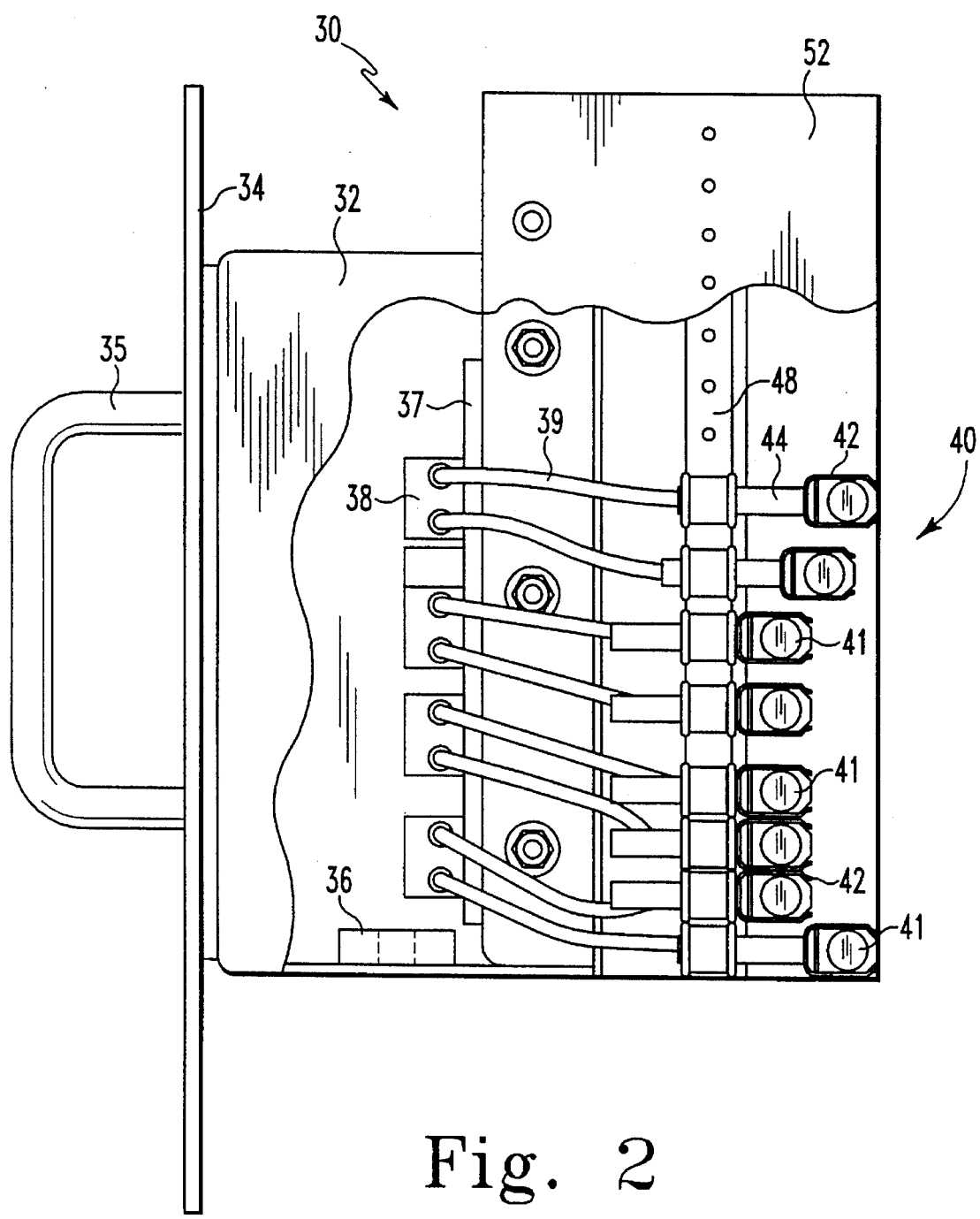
FIG. 2 is a side elevation of a heating lamp assembly with the removable chassis partially broken away to reveal certain elements of the interior.
Figure 3:
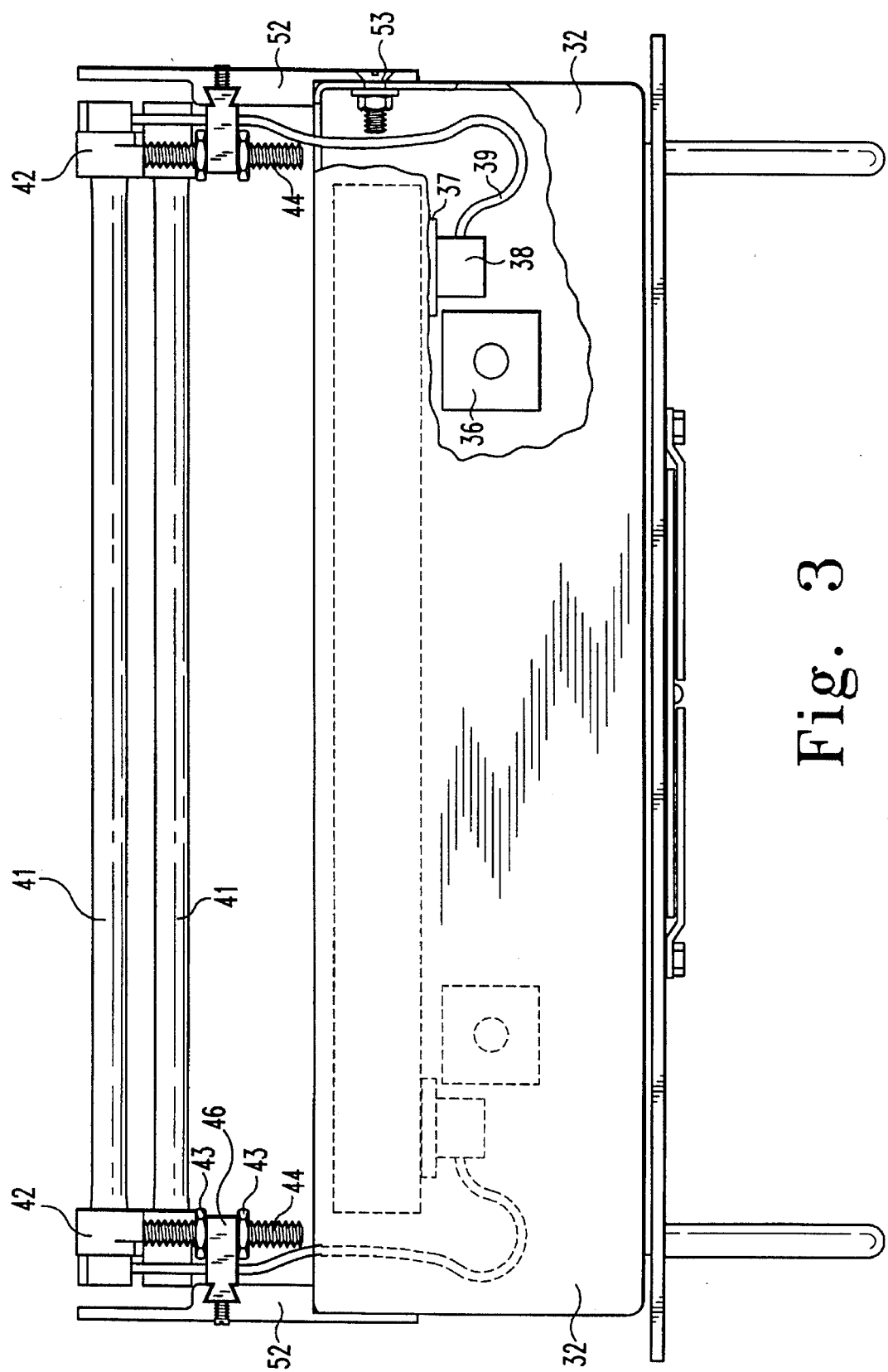
FIG. 3 is a top plan view of the heating lamp assembly shown in FIG. 2 with the chassis partially broken away.

A heating lamp assembly of the present invention can be substituted for the prior art heating lamp assembly by removing the entire array 14 of heating lamps 26 and inserting heating lamp assembly 30 as shown in FIG. 2, although some other structural modifications for the oven 10 may be required which will be apparent to those skilled in the art from this disclosure. The illustrated assembly 30, intended for use in a Sidel Model SBO-24, includes a chassis 32 having a front plate 34 which prevents access to the interior of the chassis 32 while the assembly 30 is installed in the blow molding machine oven 10. Handles 35 are coupled to the front plate 34 to permit easy handling of the assembly 30. The chassis 32 includes mounting sockets 36 adapted to cooperate with mounting pins fixed to the base 19 of the blow molding oven 10 to insure accurate placement of the assembly 30 in the oven. The chassis 32 encloses a wiring harness 37 having connectors 38 for connecting power to an array 40 of lamps 41 of a type similar to lamps 26 such as USHIO QIR-2002. The lamps 41 are each retained in position by clips 42 clipped to each end of the lamp as shown in FIG. 3. The clips 42 are connected by wires 39 to the connectors 38.

Figure 6:
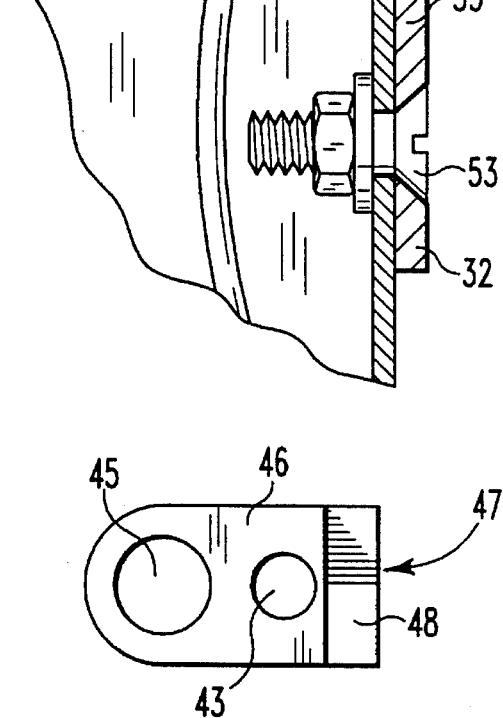
FIG. 6 is a side elevation view of a coupling for coupling the bracket and arm of the lamp holder together.

Each of the clips 42 is fixed to the end of an arm 44. The arm 44 is received through a first opening 45 in coupling 46 shown in greater detail in FIGS. 4 and 6. The wire 39 is received through a second opening 43. The coupling includes a dovetail portion 48 which is received in a dovetail shaped slot 50 in bracket 52. The bracket 52 is secured to chassis 32 by means of fasteners 53. The arms 44 are adjustably positioned with respect to couplings 46 by means of threaded nuts 43 which are threaded onto arm 44 and are positioned on either side of coupling 46. The position of each lamp 41 can be adjusted horizontally by loosening one or the other of the threaded nuts 43 and sliding arm 44 through opening 45 to the new position whereupon the two nuts 43 are again tightened on the opposing surfaces of coupling 46.

Figure 4:
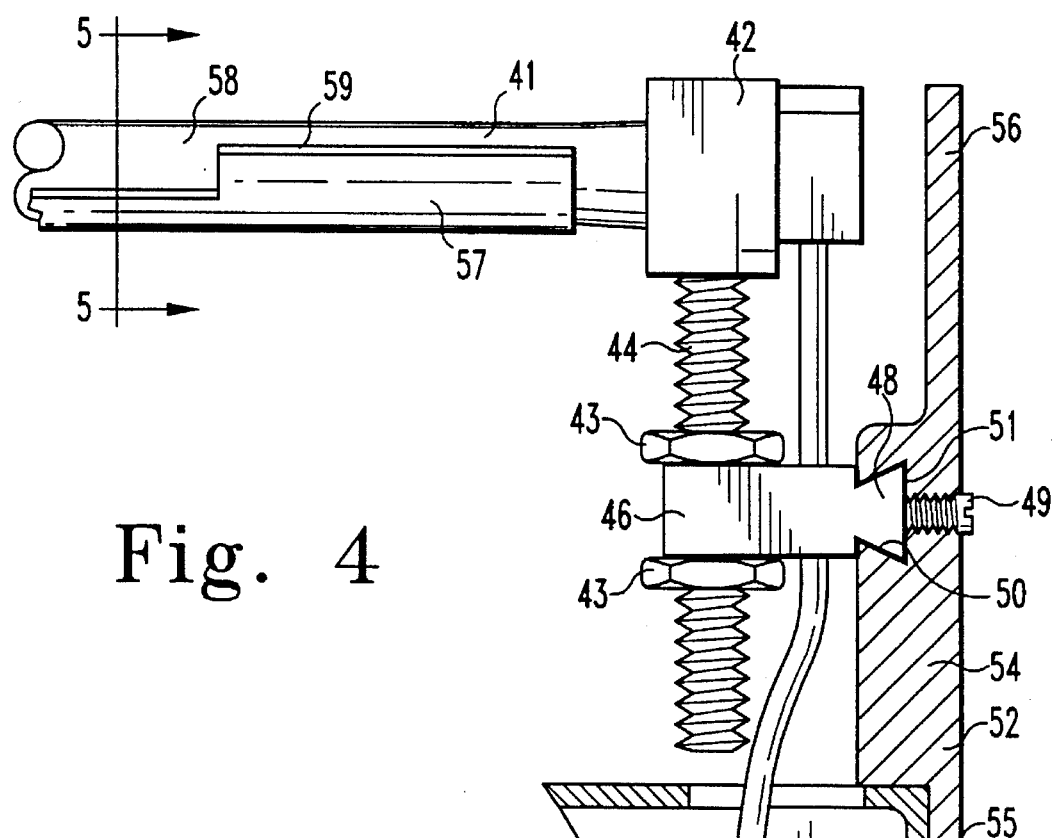
FIG. 4 is an enlarged sectional, detailed view of the lamp holder bracket, coupling, and arm.
Figure 5:
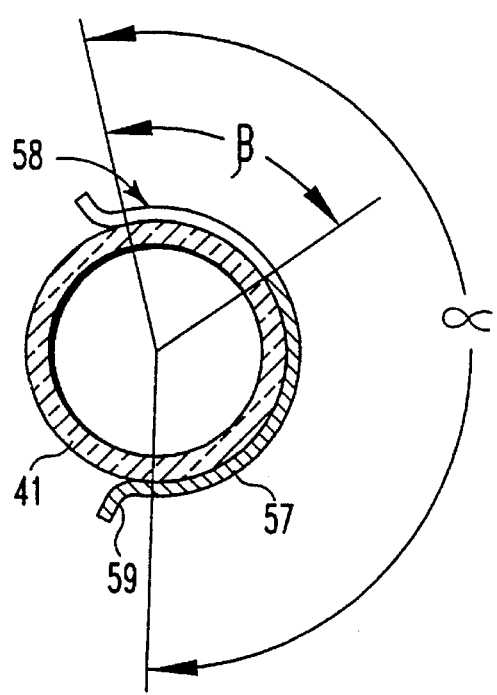
FIG. 5 is a sectional view taken along line 5—5 of FIG. 4 showing a heating lamp with a clip-on reflector.

The direction of radiant energy emitted by any of the lamps 41 can be controlled through the use of a reflector, preferably a clip-on reflector 57 as shown in FIGS. 4 and 5. The clip-on reflector 57 is formed preferably of stainless steel or a similar material which will permit the inside surface contiguous to the lamps surface to be polished to reflect any incident light. The reflector 57 has a length approximating the length of the lamp 41 and has an arcuate extent α of more than 180° and preferably about 200°. The reflector 57 includes one or more slots 58 of arcuate extent β to give the lamp sufficient flexibility to permit easy attachment and removal. The reflector 57 also includes lips 59 which permit angular adjustment of the reflector to selectively direct the emitted light toward the parison path so as preferably to impinge perpendicularly onto the surface of the parison, especially in the transition and tip areas of the parison.

The vertical position of coupling 46 can be varied by sliding the coupling 46 in the dovetail way 48 to a desired position. A set screw 49 can be adjusted to apply pressure on a lock plate 51 which in turn frictionally engages an end surface 47 of coupling 46. The increasing pressure on end surface 47 secures the coupling at a selected vertical position in the dovetail way 48. The bracket 52 is seen in FIGS. 3 and 4 to include a thickened central portion 54 and somewhat thinner rearward portions 55 and forward portions 56. The dovetail way 48 is included in the thickened central portion 54. The thinner rearward portion 55 is secured to the chassis 32 by fastener 53. The forward portion 56 projects outward and provides lateral protection for the lamps 41 and clips 42 from damage during handling of the assembly 30.

While the location of the coupling 46 with respect to bracket 52 and the position of arm 44 with respect to coupling 46 can be freely adjusted, it is the intent of the invention that such adjustment be made in a controlled manner so the position of the lamps 41 can be precisely placed at a desired location. This is achieved with the aid of an alignment assembly 60 shown in FIGS. 7–10. The alignment assembly 60 and heating lamp assembly 30 are shown coupled together in FIG. 7. The accurate positioning of the heating lamp assembly 30 with respect to the alignment assembly 60 is achieved by means of locator pins 62 which are received in sockets 36 in the bottom of chassis 32. Preferably, the locator pins 62 engage the chassis in a manner simulating the engagement between the chassis 32 and the base 19 of the blow molding oven 10.

The locating pin 62 are fixed to base plate 64. The base plate 64 also includes a positioning step 63 which cooperates with the front edge 64 of the indicator means 66 to define a dimensional framework correlating the position of the heating lamps 41 with respect to sockets 36, which in turn cooperates with pins on the oven to correlate the position between the heating lamps 41 and the line of parisons to be heated. The locating pins 62 are secured to the base plate 64 by fasteners 61 and have an outside dimension adapted to be snugly received in the openings of sockets 36.

Figure 7:
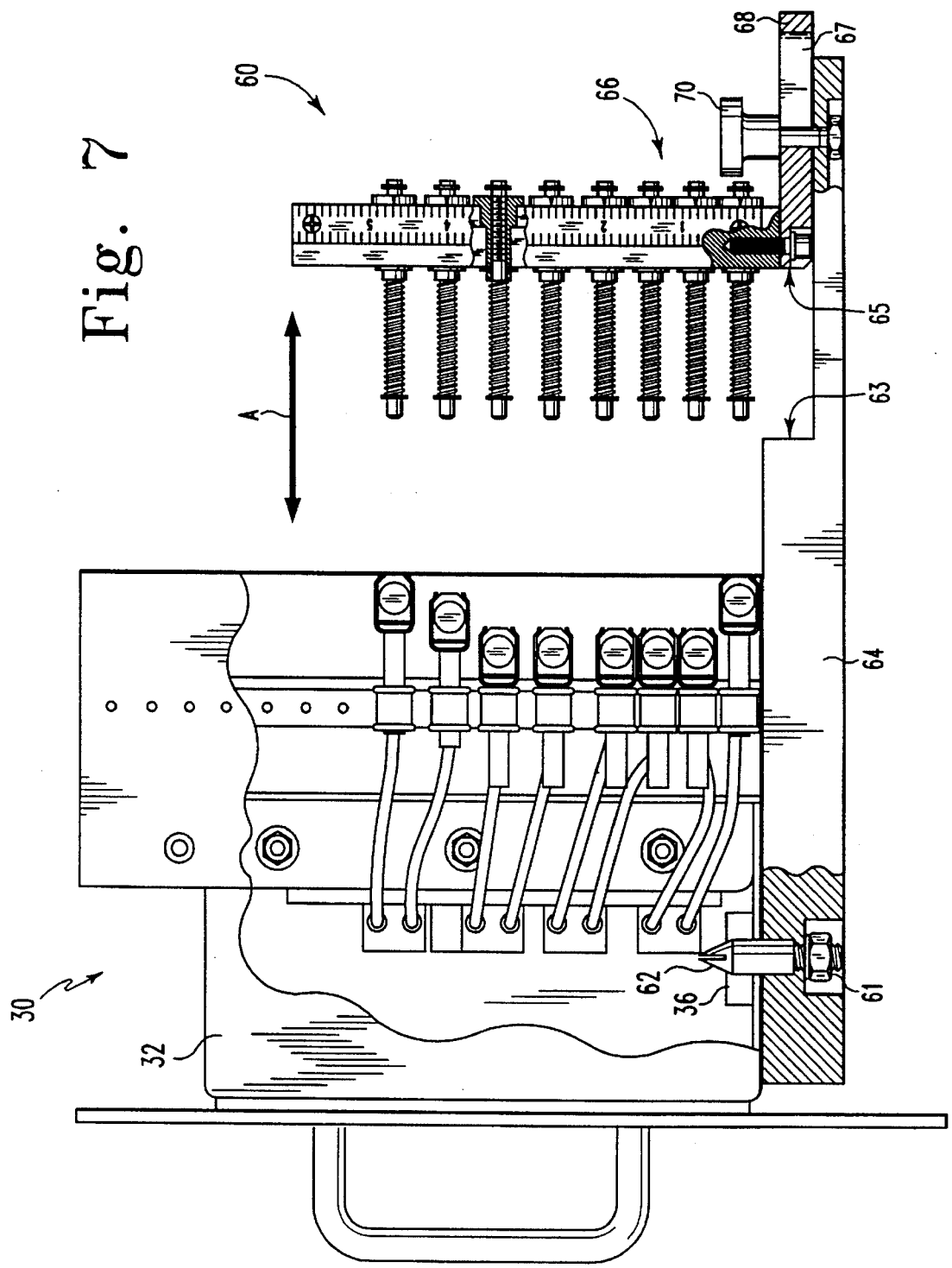
FIG. 7 is a side elevation view partially broken away of the heating lamp assembly of FIG. 2 coupled to an alignment assembly in accordance with the present invention.
Figure 9:
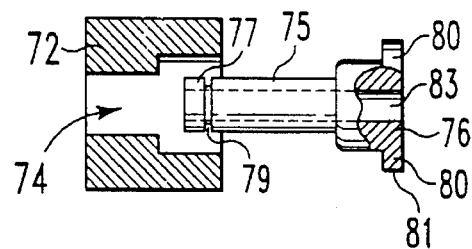
FIG. 9 is a sectional view of the vertical standard and a gauge holder shown partially disassembled.
Figure 8:
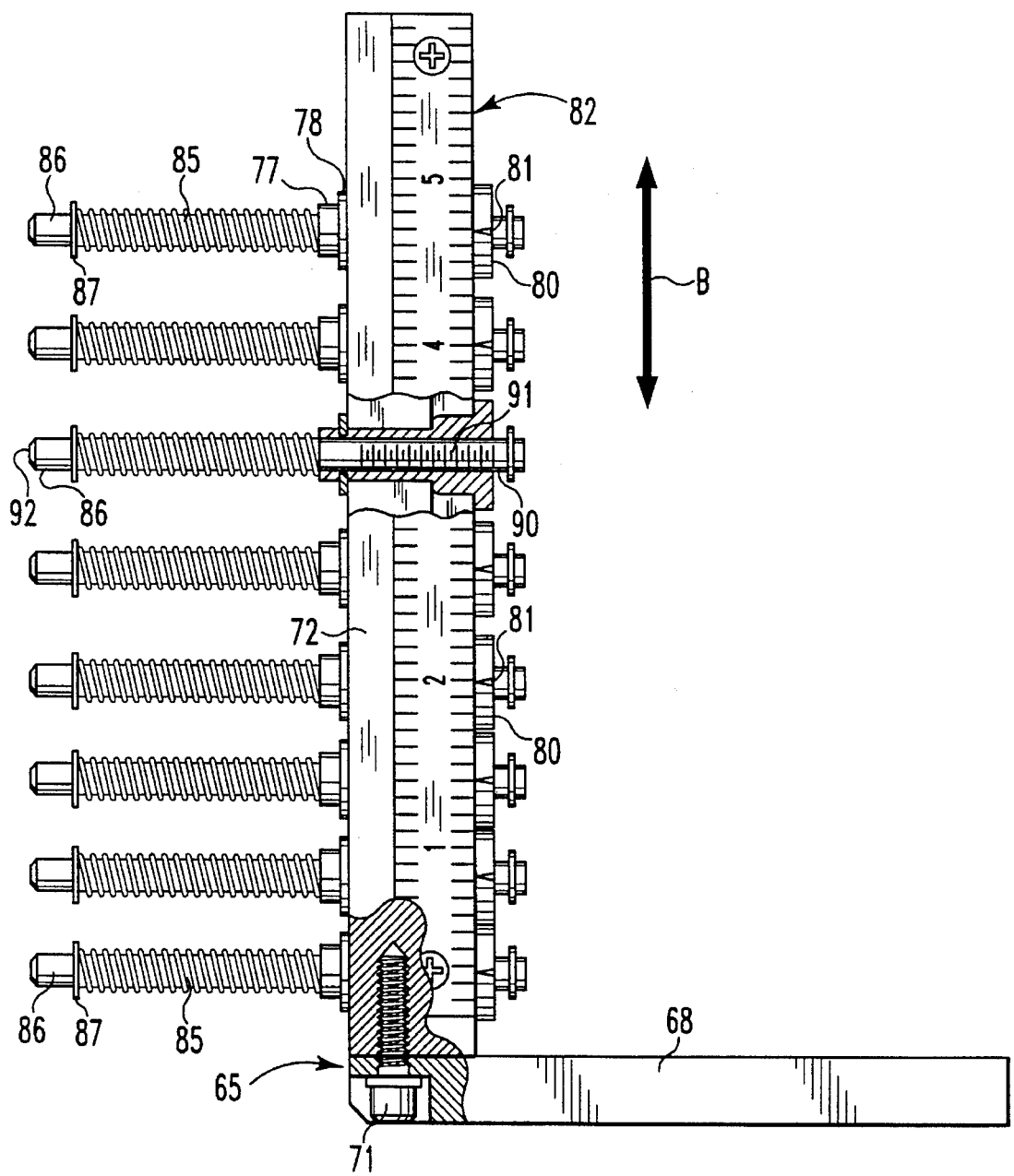
FIG. 8 is a side elevation view, partially broken away, of the indicator means of the alignment assembly.
Figure 10:
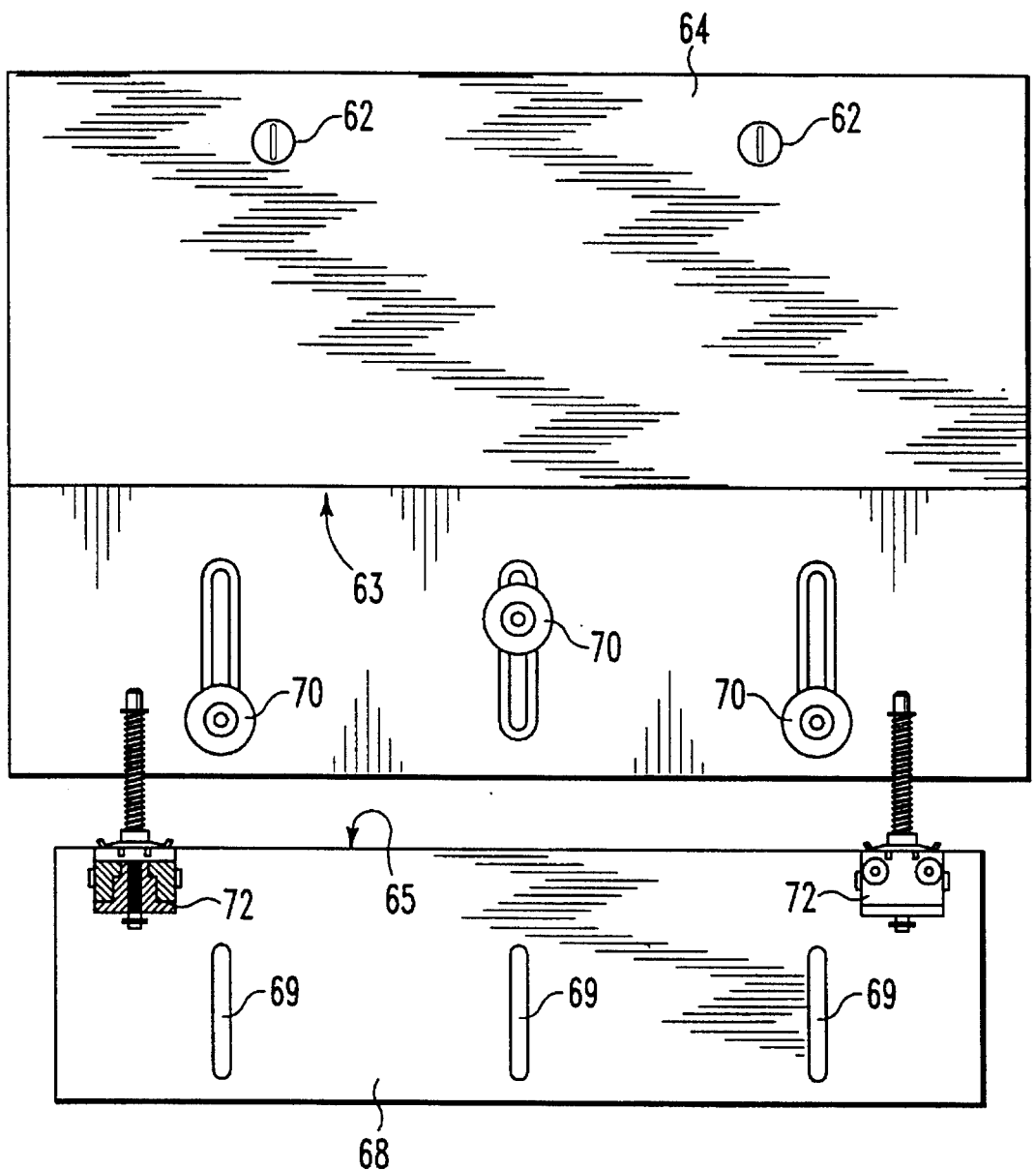
FIG. 10 is a top plan view of the alignment assembly with the indicator means being separated from the base plate.

The indicating means 66 comprises a movable plate 68 which is secured on top of base plate 64 by means of bolts 67 which project upwardly through slots 69, shown in FIG. 10, and are secured by thumb nuts 70 which, when loosened, permit plate 68 to be reciprocated in the direction of arrow A with respect to base plate 64 as shown in FIG. 7. The movable plate 68 constitutes a platform to which is secured a pair of upright standards 72 by means of fasteners 71. The standards 72 contain a T-shaped channel 74, as shown in FIG. 9, into which is received a plurality of gauge holders 76. The gauge holders 76 include a forward portion 75 which is received in the narrowest portion of channel 74 with a forward end portion 77 penetrating beyond the standard as shown in FIG. 8. A spring clip 78 received in slot 79 holds the gauge holder in the standard with sufficient force to insure frictional engagement between the holder 76 and the standard 72 in an amount sufficient for the holder not to fall of its own weight in slot 74 due to gravity. On the other hand, the spring clip 78 permits the gauge holder 76 to be slidably moved within the slot vertically in the direction of arrow B.

The gauge holder 76 also includes a laterally extending flange portion 80 which includes a small groove 81. The flanged portion 80 is not received in slot 74, but instead is retained on a back surface 82 of standard 72. A scale 84 is secured to the side of standard 72. Slots 81 on the flanged portions 80 of gauge holder 76 are employed as arrows pointing to the scale 84 to indicate the vertical position of the gauge holder 76.

The gauge holder 76 includes a central opening 83 which receives a rod-like gauge 86. The gauge 86 is biased to the position shown in FIGS. 8 and 10 by means of compression springs 85 retained in position between clip 87 and the forward end 77 of the gauge holder 72. A rear portion 90 of gauge 86 includes a series of graduations 91 which are generally hidden when gauge 86 is biased to its fully forward position as shown in FIG. 8. It will be appreciated that as the moveable plate 68 is moved toward the heating lamp assembly 30, any contact between the forward end 92 of a gauge 86 will cause a backward movement of the gauge 86 relative to holder 72 against the bias of spring 85 thereby exposing the graduations 91 from within the channel 83 behind the back surface of flange 80. The number of graduations exposed is a measure of the displacement of the gage 86 relative to the gage holder 76, standard 72, and base plate 64 if the step 63 and front edge 64 are abutting.

It will be appreciated that the alignment assembly 60 can be employed to precisely measure the existing position of an array of heating lamps in a heating lamp assembly and can also be employed to precisely adjust the position of the heating lamps to pre-set locations. Further the wholly internal adjustments of position for the heating lamps in an assembly 30 inhibits unauthorized changes in lamp position by machine operators.

While this description has referenced the illustrated preferred embodiment of the invention, intended for use in a Sidel Model SBO-24, other embodiments and variations exist having utility in connection with other machines which are within the spirit and scope of the invention as defined in the following claims.

What is claimed is:

1. A heating lamp assembly for use in an oven of a blow molding machine for heating plastic preforms prior to blow molding, the blow molding machine including means for advancing a stream of preforms along a defined path through the oven, the oven including a base situated at a fixed position with respect to the defined path and an enclosure fixed to the base enclosing a segment of the path to control the environment in the vicinity of the path segment, the heating lamp assembly comprising:

a chassis removably positioned at a preselected location relative to the base, a pair of brackets fixed to the chassis, each bracket including a way vertically arranged relative to the path, a plurality of couplings coupled in the ways, each coupling being adjustably positionable vertically relative to the bracket to which it is coupled, a like plurality of arms, each arm being coupled to one of the couplings and horizontally adjustably positionable, and a lamp holder carried by each arm for holding a lamp adjacent to the path.

2. The heating lamp assembly of claim 1 further comprising engagement means for engaging the chassis with the base at a preset location relative to said path.

3. The heating lamp assembly of claim 1 further comprising a lamp coupled between each pair of said lamp holders and reflector means coupled to the lamps for directing the lamp's radiant output toward a selected location relative to said path.

4. The heating lamp assembly of claim 1 further comprising a lock plate positioned in each of the ways and adjustment screws for adjusting the position of each lock plate within each way to contact the couplings coupled therein for fixing the vertical position of the couplings relative to the brackets.

5. The heating lamp assembly of claim 1 wherein each bracket comprises a generally rectangular plate including a dove tail groove defining the way, and each coupling comprises a tongue slidably engaging said groove for vertical movement relative to the bracket.

6. The heating lamp assembly of claim 1 wherein each coupling comprises an opening slidably receiving one of said arms, and each arm comprises a threaded member slidably received in said opening.

7. The heating lamp assembly of claim 6 further comprising at least one adjustment nut coupled to each arm and contacting each coupling for controlling the horizontal position of the arm relative to the coupling.

8. A heating lamp assembly for use in an oven of a blow molding machine for heating plastic preforms prior to blow molding, the blow molding machine including means for advancing a stream of preforms along a defined path through the oven, the oven including a base situated at a fixed position with respect to the defined path and an enclosure fixed to the base enclosing a segment of the path to control the environment in the vicinity of the path segment, the heating lamp assembly comprising:

a chassis removably positioned at a preselected location relative to the base, a pair of brackets fixed to the chassis, each bracket including a way vertically arranged relative to the path, a plurality of couplings coupled in the ways, each coupling being adjustably positionable vertically relative to the bracket to which it is coupled, a like plurality of arms, each arm being coupled to one of the couplings and horizontally adjustably positionable, a lamp holder carried by each arm for holding a lamp adjacent to the path, an array of elongated heating lamps, each lamp connected at each end to one of the lamp holders, and a reflector clipped onto at least one of the elongated heating lamps.

* * * * *